United States Patent

Brown et al.

[11] Patent Number: 5,259,010
[45] Date of Patent: Nov. 2, 1993

[54] REPLACEMENT SPACER PIN WITH LOCKING KEYS

[75] Inventors: Steve K. Brown, Lynchburg; Larry D. Dixon, Forest; John A. Orr, Lynchburg, all of Va.

[73] Assignee: B&W Nuclear Service Company, Lynchburg, Va.

[21] Appl. No.: 767,582

[22] Filed: Sep. 30, 1991

[51] Int. Cl.⁵ .............................................. G21C 3/32
[52] U.S. Cl. ..................... 376/446; 376/364
[58] Field of Search ............... 376/362, 363, 364, 445, 376/446, 262, 341

[56] References Cited

U.S. PATENT DOCUMENTS

| | | | |
|---|---|---|---|
| 4,094,558 | 6/1978 | Christiansen | 308/3 R |
| 4,668,469 | 5/1987 | Widener | 376/446 |
| 4,738,820 | 4/1988 | Wilson | 376/446 |
| 4,996,021 | 2/1991 | Bryan | 376/446 |

Primary Examiner—Donald P. Walsh
Assistant Examiner—Frederick H. Voss
Attorney, Agent, or Firm—Robert J. Edwards; Michael L. Hoelter

[57] ABSTRACT

The spacer pin of this invention is preferably threadably secured to a thermal shield normally found within reactor vessels. It comprises a main body having a cavity therein which houses a locking assembly that alternately engages or disengages the threads of the thermal shield as desired. Ideally, as bolt means are is rotated within the main body, locking keys are either moved into engagement with the threads of the thermal shield or the locking keys are removed from such engagement with the thermal shield. In this fashion, the spacer pin may be locked onto or unlocked from the thermal shield as desired. A locking cap prevents the bolt means from coming unthreaded during use and also insures that the spacer pin remains secured to the thermal shield.

12 Claims, 1 Drawing Sheet

REPLACEMENT SPACER PIN WITH LOCKING KEYS

FIELD OF THE INVENTION

This invention pertains to an internal component of a nuclear reactor and more specifically to a new design for a spacer pin used for laterally supporting and/or restraining the thermal shield within the reactor vessel.

BACKGROUND OF THE INVENTION

In nuclear reactor vessels there is located a thermal shield which effectively separates or delineates the core of the nuclear reactor from the remainder of the vessel. The function of this thermal shield is as its name implies, i.e. to thermally shield the core from the outer walls of the reactor. For proper functioning, the thermal shield must be physically restrained within the vessel, but it must be restrained in such a manner that the shield can expand and contract as needed in accordance with the heat output of the core. Thus the function of the spacer pins.

Generally, spacer pins are threaded through openings in the shield from the inside during the assembly of the reactor vessel internals. Each pin is screwed through its respective opening until contact is made with a spacer pad secured to the reactor vessel wall. After the numerous spacer pins are thusly installed and aligned (there usually being at least two levels or elevations of such pins), they are each backed off the pad about one sixteenth of an inch (1/16") before they are welded to the thermal shield. This will secure the pin in place and prevent it from coming loose or unscrewing. Afterwards, the inner tail of the pin is removed and then ground down so that the spacer pin will be flush with the inside surface of the thermal shield.

As can be seen, such assembly requires a considerable number of operations which only increases the cost and the amount of labor required for each pin. Additionally, once the pin is welded in place, it cannot easily be removed or adjusted if needed.

It is thus an object of this invention to provide a spacer pin that mechanically locks to the thermal shield so as to avoid the need for the pin to be welded in place. Another object of this invention is to provide a spacer pin that can be easily removed should such be desired. A further object of this invention is to provide a spacer pin that is adjustable to allow for the setting and resetting of the gap between the thermal shield and the reactor vessel if it becomes necessary to do so. Still another object of this invention is to provide a spacer pin that can be installed flush to the inside surface of the thermal shield so as to eliminate the time-consuming task of machining or grinding the pin flush as previously required. Another object of this invention is to provide a spacer pin that is reusable and one that has minimal void area in order to reduce neutron streaming. These and other objects and advantages will become apparent upon further investigation.

SUMMARY OF THE INVENTION

As disclosed herein, a spacer pin is provided for use in nuclear reactors that incorporates a main body having a central cavity therein and at least one side opening in communication with this cavity. Locking means are secured within this cavity and project outward through the side opening so as to wedge or jam the main body in place against the thermal shield.

DETAILED DESCRIPTION OF THE INVENTION

Figure 1:
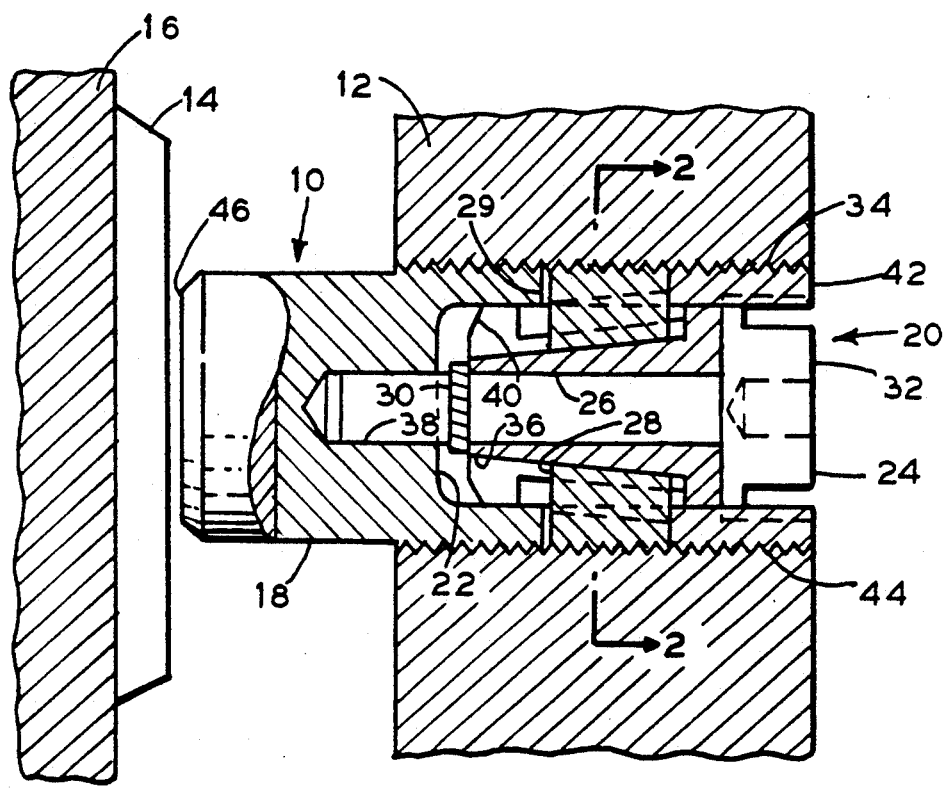
FIG. 1 is a cut-away side pictorial view of the invention threaded within the thermal shield.

Referring to the drawings, there is shown spacer pin 10 threaded within thermal shield 12. As illustrated, spacer pin 10 projects outward from thermal shield 12 and nearly contacts spacer pad 14 attached to the inside surface of reactor vessel 16. In this fashion, spacer pin 10 provides lateral expansion/contraction support to thermal shield 12 during reactor operation.

Spacer pin 10 comprises main body 18 that houses locking assembly 20 within cavity 22. Locking assembly 20 includes bolt 24, plunger 26, and locking keys 28. (In other embodiments, more or fewer locking keys 28 may be utilized.) As shown, each locking key 28 extends through an opening 29 in main body 18. Additionally, retaining ring 30, which fits within a circumferential groove (not shown) around bolt 24 in the normal fashion, retains plunger 26 against socket head 32 of bolt 24. The outer circumference of both locking keys 28 is threaded much the same as the outer surface of main body 18 is threaded. These threads 34 are thus used to thread spacer pin 10 within thermal shield 12.

Figure 2:
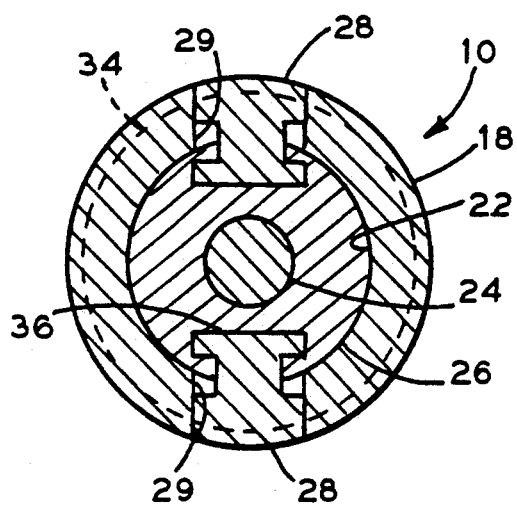
FIG. 2 is sectional view taken along lines 2—2 of FIG. 1, illustrating the tapered slot or track upon which the locking keys slide.

Referring now to plunger 26, a pair of tapered slots or tracks 36 are formed within plunger 26 into which locking keys 28 fit. As can be seen from FIG. 2, locking keys 28 are somewhat "I" shaped with a portion of plunger 26 fitting around the innermost "flange" of each locking key 28. In this fashion, each locking key 28 is physically restrained to its respective tapered slot 36. Consequently, as bolt 24 (and hence plunger 26) moves in and out along main body 18, locking keys 28 are forced to slide along tapered slot 36 thereby being wedged, jammed, or forced respectively outward and inward as desired since each locking key 28 is effectively restrained in position within opening 29. Of course, depending on the direction of movement of plunger 26, locking keys 28 will engage or butt up against a side of opening 29.

It should be noted that while bolt 24 is rotated and screwed within threaded opening 38 in main body 18, plunger 26 is not likewise so rotated. Instead, plunger 26 is designed to allow bolt 24 to freely slide or rotate within it. Additionally, it should be noted that retaining ring 30 is located along bolt 24 such that it should never physically engage main body 18. Instead, the outward thrust of locking keys 28 and their engagement with threads 34 in thermal shield 12 should prevent bolt 24 from being threaded into opening 38 to such an extent that retaining ring 30 actually contacts main body 18. Furthermore, as can be seen, both ends of plunger 26 are configured with guides 40 that maintain the alignment of plunger 26 within cavity 22. Finally, it should be noted that the length of bolt 24 is chosen such that when spacer pin 10 is properly inserted within thermal shield 12 and tightened, socket head 32 will be flush with (or slightly inset from) the inside surface of thermal shield 12.

To secure spacer pin 10 in place during use, a typical locking cap (not shown) attached to bolt 24 is provided that is subsequently crimped against outer sleeve 42 of main body 18. This operation insures that bolt 24 is and remains tight and will also prevent spacer pin 10 from vibrating. However, should it ever become desirable to remove spacer pin 10, the locking cap is un-crimped and bolt 24 is loosened. This will physically withdraw locking keys 28 from butting against threads 34 which will thus enable spacer pin 10 to be removed.

Installation of spacer pin 10 is accomplished by initially running pin 10 into an existing threaded hole or opening 44 in thermal shield 12 until contact with spacer pad 14 is made. (Generally, spacer pad 14 is a build-up of metal on or secured to the inside surface of reactor vessel 16 opposite each such hole or opening 44.) Afterwards, spacer pin 10 is backed out slightly to provide the required gap between the pin nose 46 and spacer pad 14. Once in place, bolt 24 is tightened which serves two purposes: first, locking keys 28 are physically forced outward against threads 34 as a result of tapered slots or tracks 36 thereby locking pin 10 in place. Second, the further tightening of bolt 24 within threaded opening 38 in main body 18 causes pin nose 46 to be brought or pulled back towards socket head 32. This seats the main body half of threads 34 against the back of the thermal shield half of threads 34 thereby eliminating any slack or play in threads 34. Consequently, no slack will occur or exist within spacer pin 10 in the direction that pin 10 will be experiencing axial loads (inward). Afterwards, the locking cap is affixed to outer sleeve 42 to prevent bolt 24 from unscrewing or coming loose.

As stated earlier, to remove spacer pin 10, the locking cap is first removed and then bolt 24 is rotated so as to move it out of threaded opening 38. This will cause the innermost "flanges" of locking keys 28 to be forced to slide along tapered slot 36 towards pin nose 46 as a result of the portion of plunger 26 that is wrapped around these innermost "flanges". Thus, the outer threads on these locking keys 28 will be released from engagement with threads 34 in thermal shield 12.

Furthermore, during this releasing operation, locking keys 28 will be butted up against an edge of opening 29. This will cause these locking keys 28 to be moved or forced downward along tapered slot 36 as bolt 24 is unthreaded since plunger 26 moves with bolt 24 due to retaining ring 30. As can thus be imagined, locking keys 28, which previously projected through openings 29 in main body 18, will now be withdrawn from these openings.

What is claimed is:

1. A spacer pin for use in nuclear reactors comprising:
    (a) a main body having a cavity therein and at least one opening through said main body in communication with said cavity; and,
    (b) locking means secured within said cavity and extending through said opening for securing said main body in place, said locking means comprising a tapered slot along which a locking key slides, and wherein said locking key projects through said opening.

2. The apparatus as set forth in claim 1 further comprising bolt means threadably secured to said main body for moving said tapered slot, and hence said locking key, as desired within said cavity.

3. The apparatus as set forth in claim 2 further comprising a plunger surrounding said bolt means and comprising said tapered slot, said plunger having guide means for aligning both said plunger and said bolt means within said cavity.

4. The apparatus as set forth in claim 3 further comprising locking cap means for securing said bolt means in place.

5. The apparatus as set forth in claim 4 wherein said plunger is secured to said bolt means via a retaining ring.

6. A method of spacing a thermal shield from a reactor vessel surface comprising the steps of:
    a) inserting a main body through the thermal shield and adjacent the reactor vessel surface, said main body having a cavity therein and at least one opening through said main body in communication with said cavity;
    b) securing a locking assembly within said cavity, said locking assembly comprising at least one locking key that projects through said opening; and,
    c) moving said locking assembly within said main body thereby causing said locking key to move outward or inward as desired to thereby lock or unlock said main body with respect to the thermal shield.

7. The method as set forth in claim 6 further comprising the step of threadably securing said main body to the thermal shield and further comprising the step of threadably engaging said thermal shield by said locking key.

8. The method as set forth in claim 7 wherein said locking assembly comprises a tapered slot along which said locking key slides.

9. The method as set forth in claim 8 further comprising the step of threadably securing bolt means to said main body for moving said tapered slot, and hence said locking key, within said cavity.

10. The method as set forth in claim 9 further comprising the step of installing a plunger, comprising said tapered slot, around said bolt means, said plunger having guide means for aligning both said plunger and said bolt means within said cavity.

11. The method as set forth in claim 10 further comprising the step of supplying a locking cap to said bolt means for securing said bolt means in place.

12. The method as set forth in claim 11 wherein said plunger is secured to said bolt means via a retaining ring.

* * * * *